United States Patent [19]

Sato et al.

[11] 4,278,850
[45] Jul. 14, 1981

[54] MONITORING SYSTEM FOR OPTICAL TRANSMISSION LINE REPEATERS

[75] Inventors: Masanori Sato, Machida; Yasuhiko Niiro, Yokohama; Hiroharu Wakabayashi, Tokyo, all of Japan

[73] Assignee: Kokusai Denshin Denwa Co., Ltd., Tokyo, Japan

[21] Appl. No.: 28,312

[22] Filed: Apr. 9, 1979

[30] Foreign Application Priority Data

Apr. 11, 1978 [JP] Japan .................................. 53-41782
May 8, 1978 [JP] Japan .................................. 53-54288

[51] Int. Cl.³ .............................................. H04B 3/46
[52] U.S. Cl. .............................. 179/175.31 R; 371/22
[58] Field of Search ............................ 179/175.31 R; 340/146.1 E, 146.1 C; 371/22

[56] References Cited

U.S. PATENT DOCUMENTS

| | | | |
|---|---|---|---|
| 3,692,964 | 9/1972 | Camiciottoli et al. | 179/175.31 R |
| 3,739,098 | 6/1973 | Camiciottoli et al. | 179/175.31 R |
| 3,760,127 | 9/1973 | Camiciottoli et al. | 179/175.31 R |
| 3,810,577 | 5/1974 | Drescher et al. | 340/146.1 E |
| 4,022,988 | 5/1977 | Lentz et al. | 179/175.31 R |
| 4,069,402 | 1/1978 | Mantovani et al. | 179/175.31 R |

*Primary Examiner*—David H. Malzahn
*Attorney, Agent, or Firm*—Frailey & Ratner

[57] ABSTRACT

The error rate and the operation of repeaters inserted in an optical transmission line are monitored at the terminal station on land by transmitting the test signal and monitoring the response signal of repeaters through the optical data transmission line without utilizing interstitial copper pair. Each repeater has the particular identification code, and the transmission terminal transmits the test code having the repeater identification code and an acknowledgement block with an empty bit position on the time divisional basis with the data to be transmitted. The repeater which finds his identification code in the test code, inserts the response in the acknowledgement block, and repeats the signal including both said test code and the data to be transmitted. The reception terminal analyzes the response signal of each repeater to determine the error rate of each repeaters.

8 Claims, 6 Drawing Figures

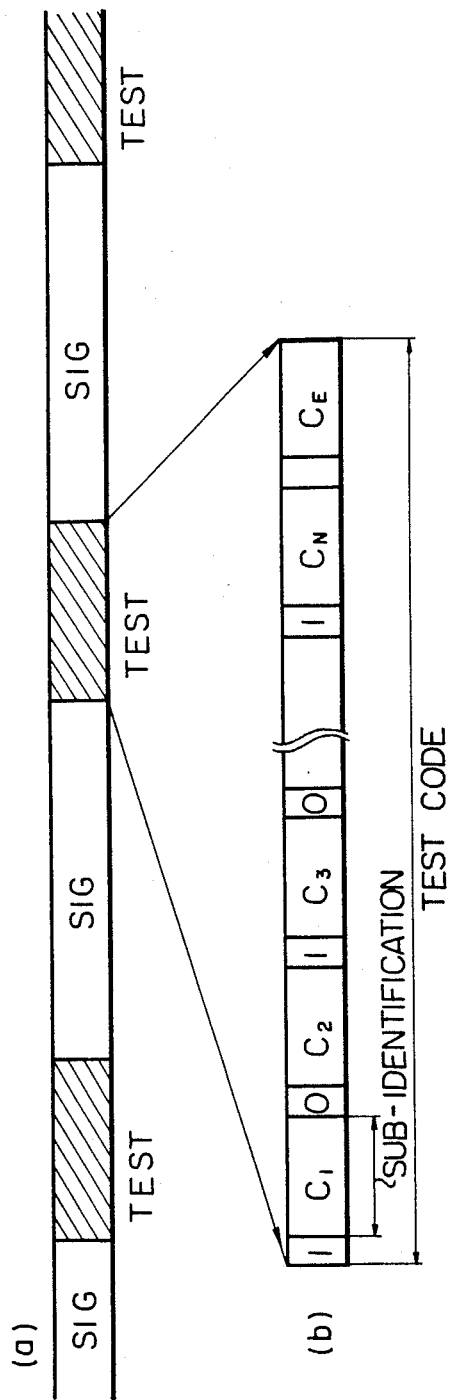

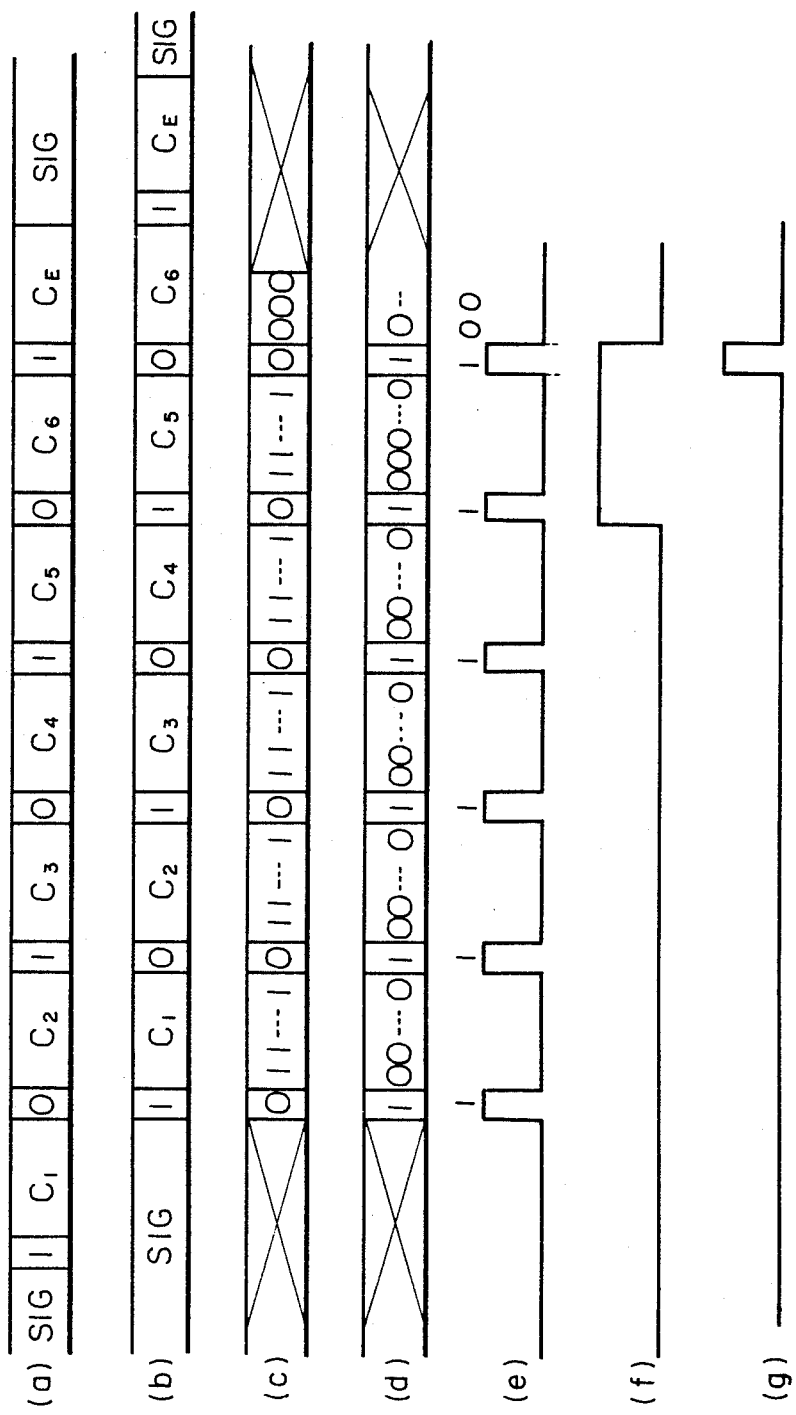

MONITORING SYSTEM FOR OPTICAL TRANSMISSION LINE REPEATERS

BACKGROUND OF THE INVENTION

The present invention relates to a monitoring system of repeaters for an optical transmission system, in particular, relates to that system for an optical digital transmission system. The present invention can be applied, for example, to a fault monitoring or a fault localization in a PCM optical transmission system which comprises optical fiber cables for each of upward and downward directions, and a plurality of PCM optical regenerative repeaters. In this case, it is supposed that each upward repeater is located at the same position as that of the corresponding downward repeater.

In the conventional fault monitoring system for the PCM transmission line, interstitial copper pair which are provided around the main transmission line are utilized in order to transmit a repeater selection signal and the result of the fault monitoring to a terminal station. However, in a long distance optical PCM submarine cable system, the presence of said interstitial copper pair makes the structure of the whole cable complicated, and require the additional repeater system for the interstitial copper pair themselves, thus the whole cable system becomes uneconomical. Further, according to a prior repeater monitoring system for PCM transmission lines, a so-called out-service monitor service has been utilized in which the main transmission line is switched to standby or idle, and a particular code trains for the purpose of only the fault location are transmitted through said intervened core cables. However, in an international long distance optical PCM submarine cable system, preventive maintenance which always monitors the operation of the cable system, and provides the basic data for locating the fault repeater, for the immediate recovery of the system fault is important. Accordingly, an in-service monitoring system in which the operation of each repeater during operation can be monitored at terminal stations on land is a more effective system.

SUMMARY OF THE INVENTION

It is an object, therefore, of the present invention to overcome the disadvantages and limitations of a prior optical cable monitoring system by providing a new and improved monitoring system for optical transmission line repeaters.

Another object of the present invention is to provide a monitoring system for optical transmission line repeaters in which an interstitial copper pair are not utilized, and instead, the monitored signal is transmitted through the main optical transmission line.

The above and other objects are attained by a monitoring system for optical transmission line repeaters comprising an optical fiber transmission line for transmitting a digital signal optically, and a plurality of repeaters inserted in said transmission line, characterized in that each repeater has the particular identification code, the transmission terminal at one end of the transmission line transmits the test code having the identification code for identifying the particular repeater and an acknowledgement block with an empty bit position on the time divisional basis with the data to be transmitted, the repeater which finds the same identification code in the test code as that of the present repeater inserts the response signal in said acknowledgement block and repeats the signal including both said test code and the data to be transmitted, and th reception terminal at the other end of the transmission line analyzes the response signal of each repeater to monitor the error rate of each repeaters.

Therefore, the present invention has at least the following features.

(a) Each repeater has the particular identification code.

(b) The test code is inserted in the data to be transmitted on the time divisional basis.

(c) The response signal of each repeater is inserted in a time slot in the test code.

BRIEF DESCRIPTION OF THE DRAWINGS

The foregoing and other objects, features, and attendant advantages of the present invention will be appreciated as the same become better understood by means of the following description and accompanying drawings wherein:

FIG. 5 shows the explanatory drawing of the signal format for the modified monitoring circuit in FIG. 4, and FIG. 6 shows the timing sequence of the operation of the monitoring circuit in FIG. 4.

DESCRIPTION OF THE PREFERRED EMBODIMENTS

Figure 1:
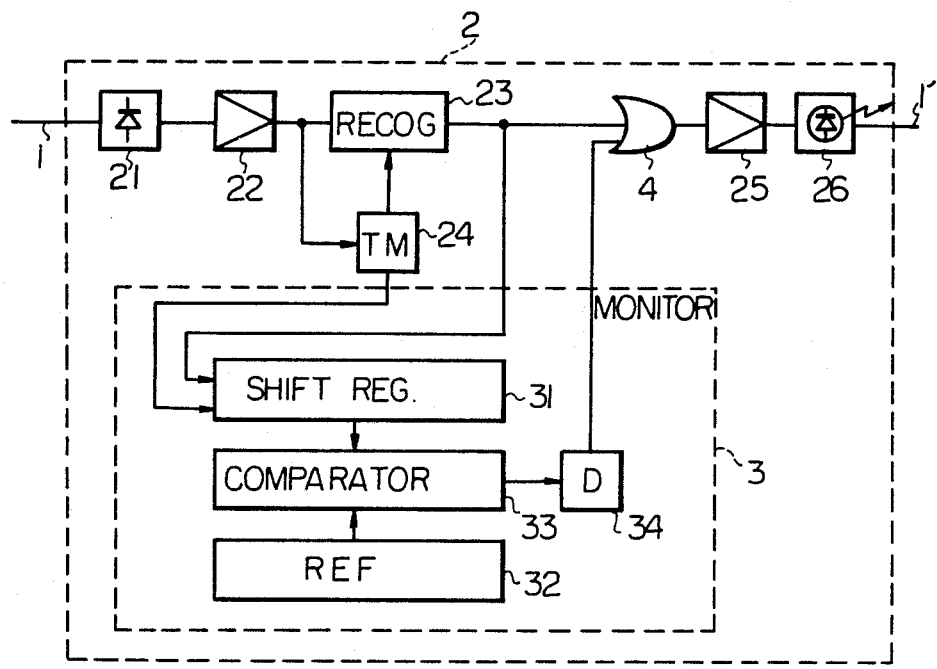
FIG. 1 is the block-diagram of the optical transmission line repeater according to the present invention.

FIG. 1 illustrates a block-diagram of the repeaters according to the present invention. In the figure, the reference numerals 1 and 1' are an optical transmission line, 2 is a regenerative repeater, and 3 is a monitoring circuit installed in the repeater 2. In the regenerative repeater 2, the reference numeral 21 is a photoelectric conversion element which converts the optical energy from the transmission line 1 to an electrical energy, 22 is an equalization amplifier circuit, 23 is a regenerative recognition circuit, 24 is a timing extraction circuit which extracts the basic timing information from the output of the amplifier circuit 22 and controls the circuit 23, 25 is a driver circuit for providing the power amplification of the repeated signal, and 26 is the electrophoto conversion circuit which converts the electrical signal from the driver 25 to an optical energy. Further, in the monitoring circuit 3, 31 is a shift-register having a predetermined bit capacity and being provided a timing signal as a clock pulse from said timing extraction circuit 24. 32 is a reference circuit which stores the reference code or the identification code allocated independently to each repeater, 33 is a comparator for comparing the content of said shift-register 31 with the output of said reference circuit 32, and 34 is a delay circuit for timing adjustment. And the reference numeral 4 is an OR gate circuit.

Figure 2:
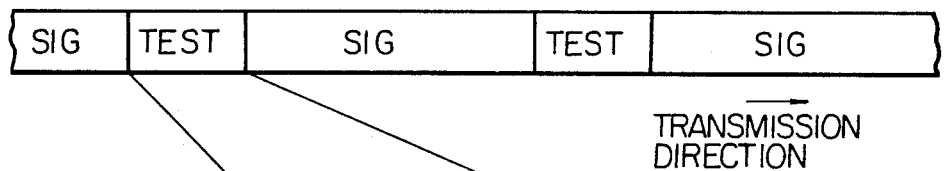
FIG. 2 is the explanatory drawing of the signal format according to the present invention.
Figure 2:

FIG. 2 shows the general format of the signal series to be transmitted into the transmission line. In FIG. 2(a), (SIG) indicates data signal to be transmitted, (TEST) indicates a test code for testing repeater error rates, and said (TEST) symbol is inserted in the transmission signal for every predetermined time intervals, or at the predetermined time positions. FIG. 2(b) shows details of a (TEST) code which comprises a repeater identification symbol (A) and an acknowledgement block (B). The acknowledgement block (B) has several bit positions following the repeater identification symbol (A). The repeater identification symbol (A) has enough bit positions for making sufficiently small the error rate of the operation of the monitoring system and for allocating each independent specific code to each repeater. Further, the shift-register 31 has the same number of bit positions as that of the repeater identification symbol (A).

In FIG. 1, when the series of signals illustrated in FIG. 2(b) are being transmitted in the transmission line 1, the monitoring circuit of each repeater determines whether the contents of the reference circuit of each repeater coincides with those of the shift-register or not. Therefore, in the repeater to be tested, when the identification codes in the signal series have been stored in the shift-register, the comparator 33 generates the coincidence output signal. On the other hand, in another repeater, because the content of the identification code differs from the content of the reference circuit, the comparator 33 does not provide an output signal. The output of the comparator 33 is applied to the driver 25 through the delay circuit 34 for the timing adjustment, and the gate circuit 4. Said driver circuit 25, then, triggers the electrophoto convertor 26. It should be appreciated that the output of the comparator 33 is generated in the time slot of the timing signal which is utilized as a clock signal in the shift-register 31, therefore, the output signal series to be transmitted will have an additional bit of information, which is generated by said comparator. And said additional information is "mark" when the comparator 33 provides the output, and that information is "space" when no output is provided from the comparator 33. The timing position of said additional information is adjusted into the bit position in the acknowledgement block (B) in FIG. 2(b) by the delay circuit 34.

At the reception terminal on land, the "TEST" code component arriving at a given time interval or at the predetermined time is extracted from the received signal, and the mark information in the acknowledgement block following the (TEST) code (A) is checked. When the mark information exists, it is quite clear that the test code is correctly transmitted from the transmission terminal to the tested repeater through some repeaters, and when there is no mark information at least one bit error has been generated between the transmission terminal and the tested repeater. Accordingly, the test of a repeater is carried out starting from the repeater closest to the transmitting terminal to the farther repeaters one after another in sequence, and by obtaining the incremental difference of the results of the error rate, the error rate of each repeater can be individually determined one after another in sequence.

Figure 3:
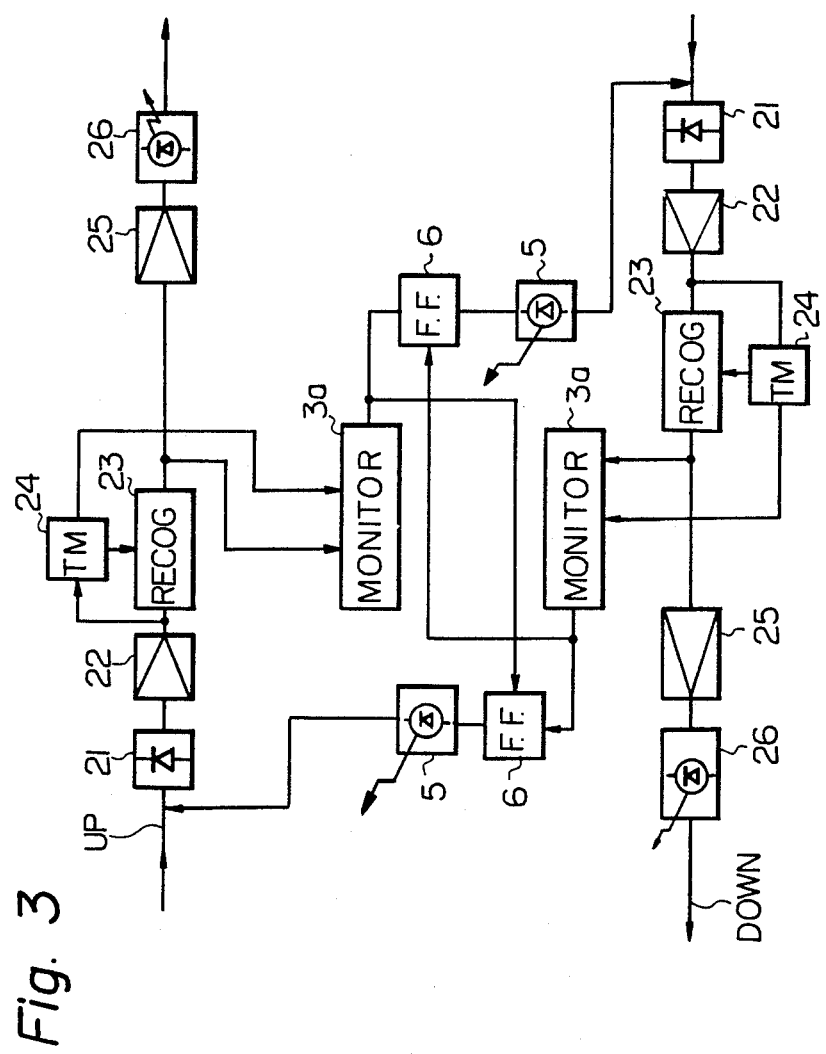
FIG. 3 is a block-diagram of another optical transmission line repeater according to the present invention.

The above description has been made with respect to a system in which a response signal is inserted to the transmission line through which the test code is also transmitted. It is also possible to insert a response signal in the transmission line in the inverse direction of the line in the pair of the transmission lines with the test code transmitted, as illustrated in FIG. 3. In FIG. 3, the monitoring circuit 3a has a similar function to the monitoring circuit 3 in FIG. 2, and is attached to every repeater in upward and downward directions. In FIG. 3, the symbol "UP" shows the upward transmission line, "DOWN" shows the downward transmission line, 5 is an electro-optical convertor, 6 is a flip-flop, and 21 is an optical-electrical convertor. In the embodiment of FIG. 3, the acknowledgement mark signal generated by the monitoring circuit 3a is inserted in the optical transmission line from the input side of the optical-electrical convertor 21, which converts the optical acknowledgement signal to an electrical signal. In FIG. 3, the test codes are inserted into the transmission line signal by time divisional basis, and are transmitted through both the upward transmission line and the downward transmission line. The coincidence mark output signal generated by the comparator in the upward direction in each repeater is temporarily stored in the flip-flop 6, and the content of the flip-flop 6 is inserted in the acknowledgement block in the test code which has the identification code of the subject repeater in the downward transmission line. The same applies to the testing conducted from the transmitting terminal of the downward transmission line.

In the present system, in case the same codes as the repeater identification codes are contained in the data to be transmitted, the transmission error would arise by forcible insertion of mark responses into the data signal components by the repeater which has the same identification codes as the string of the information. However the possibility of that error is negligibly small when the identification code has 40 bits or more, and any ill effect arising from the above error on the quality of circuit transmission can be ignored. However, when the bit length of the identification code is long, the structure of the monitoring circuit must be complicated since the shift-register, the comparator and the reference circuit must have the same bit length as that of the identification code.

Figure 4:
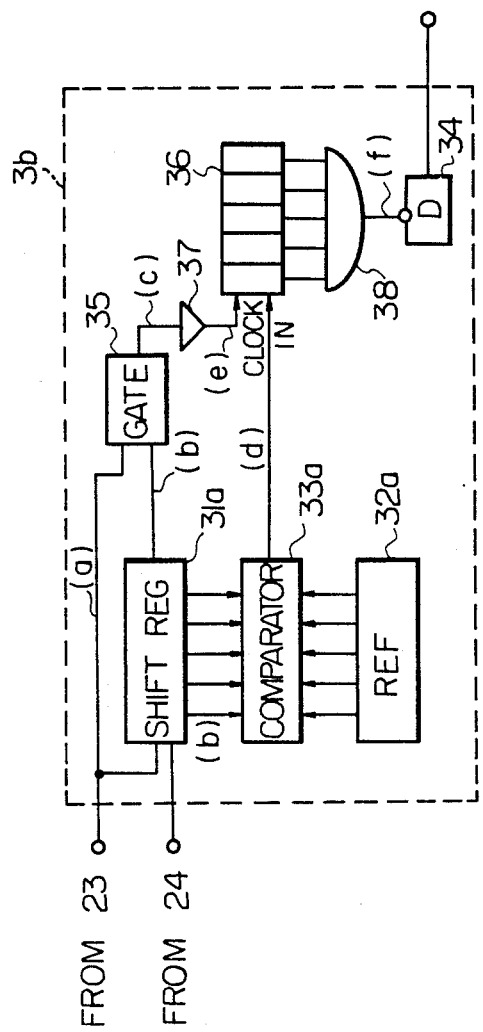
FIG. 4 is the modification of the monitoring circuit in the repeater according to the present invention.

In order to solve that problem, we propose the modification of the monitoring circuit as shown in FIG. 4. The signal format for the modified monitoring circuit is shown in FIG. 5, and the operational time sequence of the apparatus in FIG. 4 is shown in FIG. 6.

In FIG. 4, the reference numeral 31a is a shift-register, 32a is a reference circuit, 33a is a comparator, 35 is an exclusive-OR gate circuit, 36 is the other shift-register, 37 is an inverter, and 38 is an AND gate circuit. The bit length of the shift-register 31a, the reference circuit 32a and the comparator 33a are shorter than that of the identification code, for instance the former have five or six bits, and the latter has forty bits.

The signal format for operating the monitoring circuit 3b in FIG. 4 shown in FIG. 5(a), which is the same as that of FIG. 2(a), and FIG. 5(b) shows the content of the identification code in detail. In FIG. (b), the symbols $C_1$, $C_2$, , , $C_N$ are sub-identification codes, and the bit length (n) of the shift-register 31a is equal to the sum of the bit length (m) of the sub-identification code and one, that is to say, $n=m+1$. The content of the information involved in the symbols $C_1$ through $C_N$ identifies the particular repeater, and it should be appreciated that all the contents of $C_1$ through $C_N$ are the same to one another. At the head of each sub-identification code $C_1$ through $C_N$, an alternate separator code "1" and "0" are attached as shown in the figure. The code $C_E$ is the terminal code indicating the end of the identification code, and is composed by the inverse of each elements of the preceding sub-identification code so that no correlation occurs between the sub-identification code and the terminal code. The bit length of the sub-identification code $C_1$ through $C_N$ needs only to have the capacity to distinguish each repeater, thus, when there are 32 repeaters installed, only five bits ($2^5=32$) of the sub-identification code are needed. Although the sub-identification code is not long, the whole length of the identification code including all the sub-identification codes separated by the separators "1" or "0" are long enough to distinguish the identification code from the data to be transmitted.

It is assumed that the signal as shown in FIG. 6(a) is transmitted in the optical transmission line and is applied to the input of the shift register 31a. The shift register which has the bit length of the sub-identification code plus one bit, shifts the input signal serially, thus, the output signal of the shift register 31a is a delayed signal of the input signal. The output signal of the shift register 31a is shown in FIG. 6(b). The exclusive-OR gate circuit 35 performs the exclusive-OR logic of the input and output signals of the shift register 31a, then the output of the exclusive-OR gate circuit 35 is shown in FIG. 6(c), which has a plurality of blocks having continuous 1's separated by the separator "0". It should be appreciated that at the output of the exclusive-OR gate circuit 35, the content of the sub-identification block becomes "1" since all the sub-identification codes have the same content, then the exclusive-OR logic of $C_i$ and $C_{i+1}$ provides the output "1", and also the separator at the output of the exclusive-OR gate circuit 35 is "0" since the separator is arranged alternately as explained in accordance with FIG. 5(b), then the exclusive-OR logic of two continuous separators provides the "0" output.

On the other hand, the comparator 33a compares the content of the shift-register 31a with the content of the reference circuit 32a in a parallel mode. Since the content of the shift-register 31a is being shifted, the contents of the shift-register 31a coincides with the content of the reference circuit 32a only once for each sub-identification code, providing that the sub-identification code is the same as that of the reference circuit, that is, the present repeater is going to be selected. Accordingly, the output of the comparator 33a is shown in FIG. 6(d), which has the signal "1" at the position of each separator. The second shift register 36 receives the input signal from the output of the comparator 33a, and said input signal is shifted in the shift-register 36 by one bit each time the clock pulse which is applied from the output of the exclusive-OR gate circuit 35 through the inverter 37 is provided. The timing sequence of the clock pulse is shown in FIG. 6(e). If the bit length of the shift-register 36 is five bits, all the bit positions of the shift-register 36 become "1" when the comparator provides five outputs. The AND gate circuit 38 connects its inputs to each of the bit positions of the shift-register 36, thus, that gate circuit 38 provides the output signal when the shift-register 36 receives five input signals as shown in FIG. 6(f). Of course if the shift-register 36 has six bit positions, the gate circuit 38 provides the output when the comparator 33a provides the sixth output as shown in FIG. 6(g).

The termination code $C_E$ terminates the output of the gate circuit 38 as shown in FIG. 6(f) or FIG. 6(g). As mentioned before, the content of the termination code $C_E$ has no correlation with the sub-identification code $C_1$ through $C_N$, the output of the gate circuit 35 becomes "0" when the termination code $C_E$ appears at the input of the same. At the same time, the output of the comparator 33a becomes also zero as shown in FIG. 6(d). Accordingly, the zero input is applied to the shift-register 36, and then, the output of the gate circuit 38 becomes zero. Then, the termination code $C_E$ has the output of the gate circuit 38 change to zero promptly.

As described above, the duration of the output of the monitoring circuit 3b can be adjusted by controlling the number of the sub-identification codes. And although the bit length of the shift register, the comparator and the reference circuit is not long, the identification code is not confused with the data to be transmitted.

As described in detail, the present invention provides a repeater monitoring system which enables monitoring of error rates of each repeater with high precision and in a short time by attaching a simple structure of monitoring circuit in each repeater. And further, the present invention provides the test of repeaters without the use of intervened core cables, and also provides the test under operation of the circuit.

Many modifications are possible to those skilled in the art from the description of the present invention. For instance, the circuit configuration of the monitoring circuit having a shift-register with the capacity equal to the identification code, is not restricted to the embodiment. Further, the response signal inserted into the acknowledgement block can have a plurality of bits, instead of a single mark bit, and then, the more detailed information concerning the status of the repeaters can be made available at both the transmitting and the reception terminals.

From the foregoing it will now be apparent that a new and improved monitoring system for optical transmission line repeaters has been found. It should be understood of course that the embodiments disclosed are merely illustrative and are not intended to limit the scope of the invention. Reference should be made to the appended claims, therefore, rather than the specification as indicating the scope of the invention.

What is claimed is:

1. In an optical digital transmission system including a transmitting station coupled by way of a transmission line to a receiving station and at least one intermediate repeater station, the combination therewith of:
    (a) optical pulse generating means at said transmitting station for establishing a test signal on a time divisional basis with the data to be transmitted, said test signal comprising an indentification code for identifying a particular repeater station and an acknowledgement block having an empty bit position,
    (b) decoding means at said repeater station for decoding said identification code, said decoding means outputting an acknowledgement signal upon recognition of said identification code,
    (c) delaying means at said repeater station coupled to the output of said decoding means for delaying said acknowledgement signal to achieve time coincidence with said empty bit position in said acknowledgement block, and
    (d) gating means at said repeater station coupled to the outputs of said delaying means and the transmission line for combining said test and data signals with said acknowledgement signal on a time divisional basis for transmission to said receiving station.

2. The combination of claim 1 wherein said repeater station includes photoelectric conversion means coupled to said transmission line for converting between optical signals in said transmission line and electrical signals for use by said repeater station.

3. The combination of claim 1 wherein said repeater station includes regenerative recognition means coupled between said transmission line and said gating means for regenerating said test and data signals.

4. In an optical digital transmission system including a transmitting station coupled by way of a transmission line to a receiving station, and at least one intermediate repeater station, the combination therewith of:

(a) optical pulse generating means of said transmitting station for establishing a test signal on a time divisional basis with the data to be transmitted, said test signal comprising an identification code for identifying a particular repeater station and an acknowledgement block having an empty bit position, (b) photoelectric conversion means at said repeater station for converting said optical signals in the transmission line into electrical signals, (c) regenerative recognition means at said repeater station coupled to the output of said photoelectric conversion means for regenerating said test and data signals, (d) decoding means at said repeater station coupled to the output of said photoelectric conversion means for decoding said identification code, said decoding means outputting an acknowledgement signal upon recognition of said identification code, (e) delaying means at said repeater station coupled to the output of said decoding means for delaying said acknowledgement signal to achieve time coincidence with said empty bit position in said acknowledgement block, (f) gating means at said repeater station coupled to the outputs of said delaying means and said regenerative recognition means for combining said test and data signals with said acknowledgement signal on a time divisional basis, and (g) electric to photo conversion means at said repeater station coupled between the output of said gating means and the transmission line for converting electrical signals into optical signals for transmission to said receiving station.

5. The combination of claims 1 or 4 wherein said acknowledgement signal is inserted in the transmission line.

6. The combination of claims 1 or 4 wherein said identification code comprises a plurality of sub-identification codes separated by alternating single bits of "1" and "0", said sub-identification codes having identical contents with respect to each other.

7. The combination of claims 1 or 4 wherein said transmission line includes an upward and downward direction, each direction having at least one repeater station, wherein said test signal flows in one of said directions and said acknowledgement signal is inserted in the other direction.

8. A repeater for an optical transmission system comprising:

(a) photoelectric conversion means coupled to said optical transmission system for converting optical signals into electrical signals, (b) equalization amplifier means coupled to the output of said photoelectric conversion means for equalizing and amplifying said signals, (c) regenerative recognition means coupled to the output of said equalization amplifier for regenerating said signals, (d) decoding means coupled to the output of said equalization amplifier means for decoding said signals, said decoding means outputting an acknowledgement signal upon recognition of the identification code of said repeater, (e) delaying means coupled to the output of said decoding means for delaying said acknowledgement signal, (f) gating means coupled to the outputs of said delaying means and said regenerative recognition means for combining said signals with said acknowledgement signal on a time divisional basis, and (g) electric to photo conversion means coupled between the output of said gating means and the transmission system for converting said combined signals into optical signals.

* * * * *